United States Patent [19]

Keller-Steinbach

[11] Patent Number: 4,523,095

[45] Date of Patent: Jun. 11, 1985

[54] RADIATION DETECTOR WITH ASYMMETRICAL PATTERN

[75] Inventor: Christiane Keller-Steinbach, Maennedorf, Switzerland

[73] Assignee: Eltec Instrument A.G., Wallisellen-Zurich, Switzerland

[21] Appl. No.: 443,180

[22] Filed: Nov. 19, 1982

[51] Int. Cl.³ .......................... G01J 5/08; G08B 13/18

[52] U.S. Cl. .................................... 250/349; 250/342; 250/353

[58] Field of Search ............... 250/353, 342, 349, 221, 250/340; 340/567, 565

[56] References Cited

U.S. PATENT DOCUMENTS

| | | | |
|---|---|---|---|
| 4,317,992 | 3/1982 | Stauffer | 250/221 |
| 4,375,034 | 2/1983 | Guscott | 250/342 |

*Primary Examiner*—Alfred E. Smith

*Assistant Examiner*—Carolyn E. Fields

*Attorney, Agent, or Firm*—Duckworth, Allen, Dyer & Pettis

[57] ABSTRACT

A radiation detector having a plurality of discrete fields of view with respect to a plurality of sensing elements. The sensing elements are connected such that their output signals are summed to zero if all elements are receiving the same radiation. Optical elements focus on the sensing elements to produce the discrete fields of view and are adapted to produce non-uniform sensitivity of the patterns over the solid angle thereof whereby a non-zero output will be produced when the sensing elements receive differing amounts of radiation. In one embodiment, a shield is disposed between elements to block radiation to a sensing element from one portion of the solid angle and to pass radiation from another portion of the solid angle.

7 Claims, 11 Drawing Figures

PRIOR ART
Fig. 4
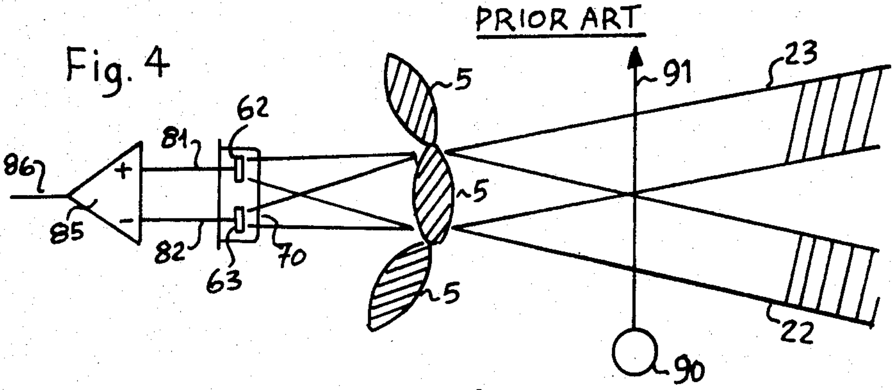
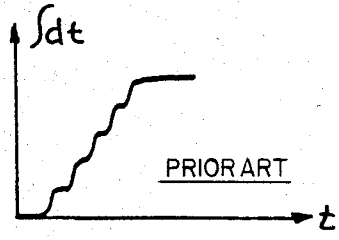
PRIOR ART
Fig. 5
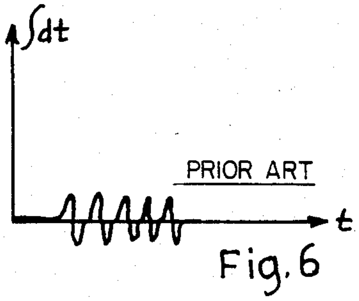
PRIOR ART
Fig. 6
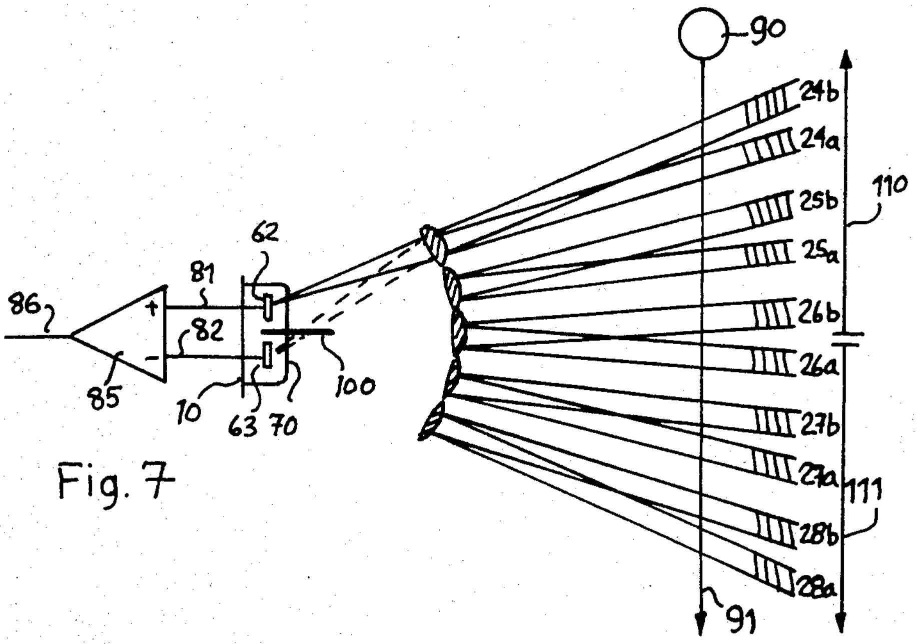
Fig. 7

Fig. 8
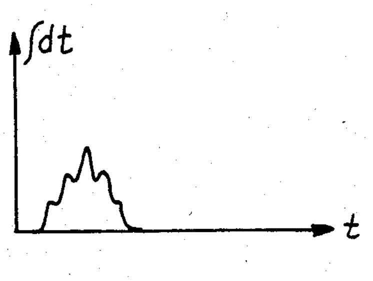
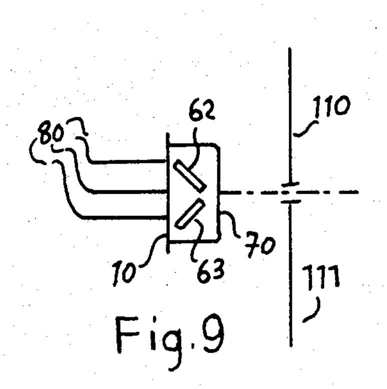
Fig. 9
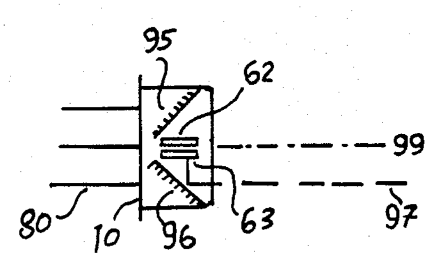
Fig. 10
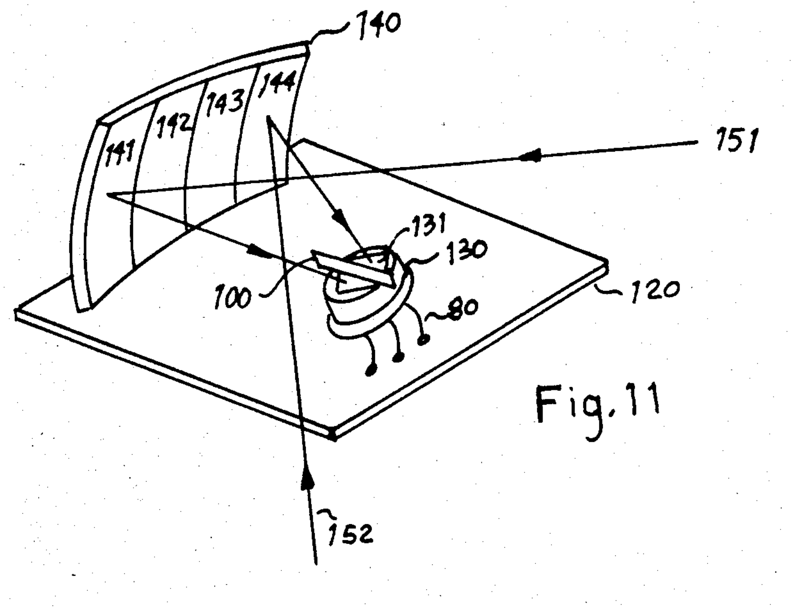
Fig. 11

RADIATION DETECTOR WITH ASYMMETRICAL PATTERN

BACKGROUND OF THE INVENTION

1. Field of the Invention

The present invention relates to a radiation detector with at least two sensing elements and more specifically to a detector having a plurality of radiation sensitive fields of view with an asymmetric pattern.

2. Description of the Prior Art

It has been known to use radiation detectors sensitive to infrared radiations to detect persons moving in a room. The infrared detectors are sensitive to the normal IR radiation from the human body. These types of detectors are commonly used as intruder alarms and the like. It also has been common to concentrate the sensitivity of the radiation detector into a plurality of very narrow solid angles, called fields of view, so as to cover a desired area such that a person entering that area will pass through at least one of such fields of view.

U.S. Pat. No. 2,198,725 teaches apparatus that produces a number of stripe and beam shaped fields of view by means of a grid pattern in front of the radiation detector. Such beam shaped fields of view can also be produced by an arrangement of concave mirrors adjusted to point in the appropriate direction such as disclosed in U.S. Pat. Nos. 3,703,718 and 4,058,726. Through the use of lenses, such as Fresnel lenses and objectives, each beam can be adjusted to point in a desired angle with each lens or objective producing one field of view. Swiss Pat. No. 596,619 describes a system using various combinations of plain, cylindrical, and double curved mirrors and lenses. These prior art devices and systems are intended to cover a plurality of discrete fields of view simultaneously using either a single radiation detector, or an array of radiation detectors mounted adjacent to each other.

Early intruder alarms or motion detectors have used a single radiation detector having sufficient sensitivity to detect people or other objects whose temperature differed from the ambient temperature. Although these detectors were satisfactory during conditions of uniform ambient temperature, the detectors were very sensitive to disturbances in the ambient temperature such as turbulences of air due to heating and air conditioning systems, to sunlight, external vehicle headlights, and other sources of radiation which would lie in the spectral sensitivity range of the sensor. The basic problem with the early systems was that numbers of false alarms were created, decreasing the effectiveness of their use in security systems.

The high false alarm rate problem was solved subsequently using at least two closely spaced sensing elements connected to form a differential sensor. For example, in a dual element system, one element produces a positive going signal and the other element produces a negative going signal when exposed to the same radiation. Thus, if the ambient temperature changes or an external source such as air turbulence or sunlight strikes the unit, each element will be equally energized and the two signals will cancel. Thus, signals from such ambient sources are essentially rejected when the system is symmetrical and exactly balanced. However, the two sensors will have different fields of view or sensitivity patterns. A person moving through the fields of view will normally be detected first by one element and later by the other element. Thus, no cancellation takes place and both signals are passed to suitable amplifiers and relays to produce a desired alarm or other indication.

A major disadvantage of the above described multielement systems is that they are not able to detect moving objects very close to the sensor since the fields of view of the multiple sensors will necessarily overlap in that range. It has been found that an intruder moving close to this type of sensor used in a security system will not be detected and can tamper with or cover the sensing elements without detection.

While attempts have been made to solve this problem by combining a single sensor and a differential sensor, producing asymmetry in a differential sensor, and similar approaches, the result has been a system which immunity to disturbances is reduced and represents a compromise. Thus, there is a need for an infrared motion or body detecting system which will be free from false alarms due to ambient disturbances but that will detect objects or bodies at both near and far ranges.

SUMMARY OF THE INVENTION

The present invention solves the problem of providing a radiation detector which is symmetrical and has high sensitivity in its fields of view at any distance yet maintains a high immunity against thermal disturbances. A plurality of sensing elements is used in the radiation detector of the invention such that individual signals resulting from simultaneous illumination of sensing elements, such as will occur from a thermal disturbance, are added to be essentially zero. An optical focusing system is used which produces a plurality of fields of view forming a solid angle pattern. Means are provided which make the pattern asymmetrical with respect to the sensing elements. A body moving through the pattern will produce energy on the sensors which is integrated to produce a signal output indicative of such motion. The field of view of each sensor is produced such that it is effective both at close up range and at a desired maximum distance.

BRIEF DESCRIPTION OF THE DRAWINGS

FIG. 4 is a top cross sectional view of a prior art dual detector producing multiple fields of view by means of lenses;

FIG. 5 is a plot of the output of the prior art detector of FIG. 1 due to integration of received radiation;

FIG. 6 is a plot of the output of the prior art detector of FIG. 4 due to integration of the received radiation by the dual detector;

FIG. 7 is a top cross sectional view of a dual differential detector having an asymmetric pattern producing means provided in accordance with the invention;

FIG. 8 is a plot of an output signal from the detector of FIG. 7 resulting from a radiating body moving through the asymmetrical pattern;

FIG. 9 shows a top cross sectional view of an alternative embodiment of the invention which produces an asymmetrical field;

FIG. 10 shows a top cross sectional view of a detector in accordance with the invention which produces an asymmetrical pattern with minimum blocking of the detector; and FIG. 11 shows a practical implementation of the invention having the curved segmented mirror for producing multiple fields of view and an asymmetrical dual detector mounted to a printed circuit board.

DETAILED DESCRIPTION OF THE PREFERRED EMBODIMENT

Figure 1:
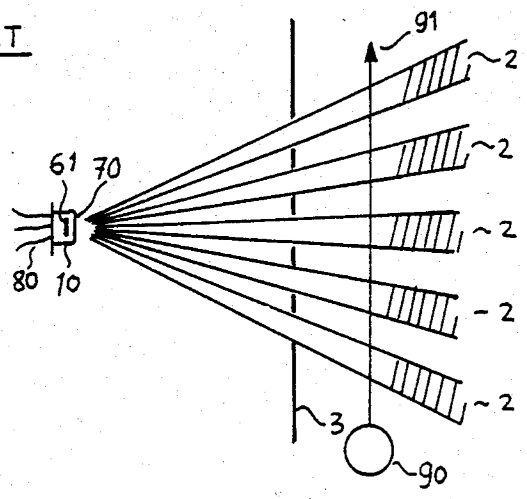
PRIOR ART Fig. 1
FIG. 1 is a top cross sectional view of a prior art single element radiation detector producing multiple fields of view by means of a grid.
Figure 2:
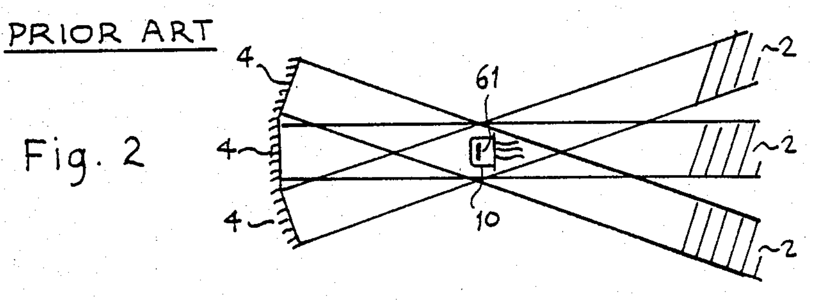
PRIOR ART Fig. 2
FIG. 2 shows the prior art detector of FIG. 1 producing multiple fields of view by use of a segmented mirror.
Figure 3:
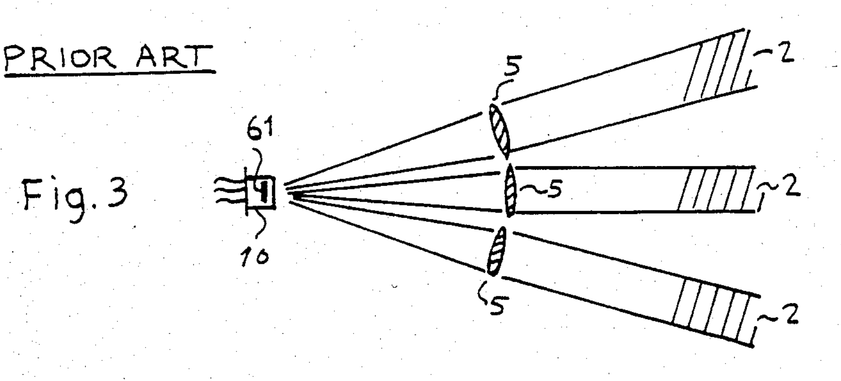
PRIOR ART Fig. 3
FIG. 3 shows the prior art detector of FIG. 1 producing multiple fields of view by means of multiple lenses.

Referring to FIG. 1, a top view of a prior art single sensing element 61 is shown in which sensing element 61 is nounted in housing 10 shown in cross section. A grid 3 having a plurality of openings is shown. As may be understood, an object or person 90 moving past the grid structure 3 as indicated by arrow 91 will successively pass through a plurality of fields of view 2. Thus, the object or person 90 will not be in more than one field of view at a time, although external thermal sources such as hot and cold air, lights, and the like would fall within all of the fields of view. In FIG. 2, another prior art arrangement is shown in top view which produces an analogous field of view to that shown in FIG. 1 is illustrated using a mirror formed by a plurality of mirror segments 4. Here, the fields of view 2 are produced by reflection of energy from a mirror segment 4 into sensing element 61 shown in housing 10 in cross section. In FIG. 3, a similar prior art arrangement is illustrated in which a plurality of lenses 5 produce non-overlapping fields of view 2. Although discrete lenses 5 are shown, these may be produced in the form of Fresnel segmented lenses. In practice it has been preferred to use an arrangement such as disclosed in FIG. 2 and FIG. 3 rather than the form of FIG. 1 since the divergence of the fields of view are less and a greater range can be obtained.

Turning now to FIG. 4, a prior art differential arrangement similar to that of FIG. 3 is utilized; however, adjacent sensing elements 62 and 63 are mounted in a housing, shown in a cross sectional top view, having a window 70 transparent to infrared radiation with the elements 62 and 63 connected to differential amplifier 85 by their respective output leads 81 and 82. The unit is referred to as a dual or differential sensor. Lenses 5 produce the desired set of separate fields of view. In this example, sensing element 62 produces field of view 22 and sensing element 63 produces field of view 23. Amplifier 85 is configured to sum the input signal on lead 81 having a positive sign and the signal on input lead 82 having a negative sign. As may be understood, a signal due to radiation occuring in both fields of view 22 and 23 will be essentially equal and therefore the output from amplifier 85 on lead 86 will be essentially zero while a moving body 90 which would first enter field of view 22 would produce a positive signal on lead 86 and would produce a negative signal on lead 86 as body 90 pass through field of view 23.

In FIG. 5, the time integral of the radiation incident on a prior art sensor such as shown in FIG. 1 is indicated. When the object 90, which is assumed to be producing infrared radiation, moves along path 91 in FIG. 1, the radiation absorbed by the sensing element 61 will incrementally raise its temperature producing an electrical signal as shown. Due to the relatively slow thermal response of such sensors, an integrating effect will take place for rapidly changing signals. In this instance, as object 90 passes through the successive fields of view 2 each will add heat energy to the sensing element causing the shown integration or stairstep-like waveform in FIG. 5. It will also be seen that the closer the object 90 is to the sensor, the shorter will be the pulses of energy incident on the sensor. The detection capability of the detector is defined by the maximum value of the time integral since passing through each field of view adds an additional positive amount to the integral.

When using a prior art differential connected sensor in accordance with FIG. 4, and assuming that each sensor has five fields of view such as may be produced by five lenses 5, the integrated output on lead 86 from amplifier 85 may appear as shown in FIG. 6. As may be noted, as object 90 on path 91 passes through the first field of view 22 of sensing element 62, a positive going short pulse will be produced. As the object 90 progresses into field of view 23 of sensing element 63, a negative going signal will be produced which essentially cancels the positive going signal. As the object 90 enters the two fields of view produced by the next lens 5, the positive going and negative going signal will be produced with five such sets of pulses being produced for the assumed five differential fields of view. As will be noted, the magnitude of the signal in FIG. 6 never achieves a large amplitude and, in most cases, would be indistinguishable from circuit noises and other disturbances.

The preferred embodiment of the invention utilizes the principles shown in the above illustrations but overcomes the noted problems through novel means for controlling the pattern sensitivity. As seen in FIG. 7, a dual differential sensor using sensing elements 62 and 63 are mounted adjacent each other with a shield 100 disposed between the two elements 62, 63 and projecting forward therefrom at an angle, which may be 90°. Sensing elements 62 and 63 are mounted in housing 10 shown in cross sectional top view. Shield 100 may be mounted within the housing 10 or external thereto. Shield 100 is formed from a material which may either absorb infrared energy, partially or fully reflect infrared energy or be semi-transparent thereto. A set of lenses 5 is arranged in an arcuate pattern in front of sensing elements 62 and 63 producing a plurality of fields of view identified as 24*a*, 24*b* through 28*a*, 28*b* with the "a" pattern associated with sensing element 62 and the "b" pattern associated with sensing element 63. Although lens system 5 shows five lenses, it will be obvious that more or less lenses may be utilized as required for the desired application of the invention Due to shield 100, the energy falling on sensing element 62 is produced mainly by the set of fields of view indicated in the half solid angle 110 while sensor element 63 obtains its major radiation from the half solid angle 111. However, it will be recognized that thermal disturbances which illuminate the entire field of view simultaneously will result in sensor 62 and sensor 63 receiving essentially the same amount of radiation due to the symmetry of the system. Therefore, the sum of such two signals at the output of amplifier 85 on lead 86 will be essentially zero and can be neglected.

It will be noted that the sensitivity of the fields of view in half solid angle 110 will result in sensor 62 having a much higher sensitivity thereto than sensing element 63. That is, sensing element 62 will receive essentially full energy from the fields of view 24*a*, 25*a*, and 26*a* while sensing element 63 is shielded from energy occurring in field of view 24*b* as indicated by the dashed lines as well as from 25*b*. Essentially equal energy will be received by element 62 and element 63 from field of view 26*a* and 26*b*, respectively. By the same token, sensing element 63 will be more sensitive to radiation occurring in half solid angle 111 than sensing element 62.

In FIG. 8, a graph of the time integral of the signal on lead 86 from the embodiment of FIG. 7 is seen which results from the passing of object 90 through the fields of view on the path 91. It is to be understood that the signal of FIG. 8 on leads 86 is the sum of the signals occurring on lead 81 from sensor 62 with a positive polarity and the signal on lead 82 of sensor 63 with a negative polarity. Due to the different sensitivities of the individual fields of view, the first positive going signal as the object passes through field of view 24*a* will add to the integral and the negative going signal produced by passage through field of view 24*b* will be quite small. The same action occurs with respect to fields of view 25*a* and 25*b*. The central peak of the waveform occurs due to the positive going and negative going signal of approximately the same value from fields of view 26*a* and 26*b*. As the object moves through the half solid angle 111, the waveform decreases negatively with an end value of zero. Note also that the waveform of FIG. 8 includes little or no influence from thermal disturbances since these are assumed to fall on each element equally and cancel out in amplifier 85.

Shield 100, in accordance with FIG. 7, can be varied in size and position depending on the particular performance requirements of the system. It will be apparent that the size and position of shield 100 will affect the individual sensitivity of the fields of view of each sensor. Although FIG. 7 indicates shield 100 attached to housing 10, it may be mounted external to housing 10 if desired. Shield 100 can be made asymmetrical as long as it does not interfere with the sensing element 62 and 63 receiving equal energy from thermal disturbances. Although disclosed with respect to a dual element system, it will also be obvious that shield 100 may be used advantageously with systems having more than two sensors.

An alternative embodiment of the invention is indicated in FIG. 9. Here, housing 10 is shown in top cross sectional view with sensing elements 62 and 63 mounted such that the planes of the elements have an angle therebetween. Thus, sensor 62 will have a higher sensitivity to radiation originating only in the half solid angle 110 and sensor 63 has a higher sensitivity to radiation originating only in half solid angle 111. Again, thermal disturbances will influence the two sensing elements 62, 63 simultaneously producing a summed output from leads 80 equal essentially to zero. It will be obvious to those of skill in the art that leads 80 from sensing element 62 and 63 in which one lead is common and the other two leads represent the output from the respective elements 62 and 63 may be connected to a dual channel summing amplifier or differential amplifier in accordance with the polarities. Alternatively, sensing elements 62 and 63 may be connected in series opposing or parallel opposing in which case a single ended output is available to a single ended amplifier.

Another alternative embodiment of the invention is illustrated in the top cross sectional view of housing 10 assumed to be cut away to show sensing elements 62 and 63 approximately parallel to each other and at right angles to the plane of detection. By the use of two angled mirrors 95 and 96, incoming radiation can be reflected to sensors 62 and 63, respectively. Thus, any of the lens systems previously described may be utilized to generate the desired multiple fields of view. Mirrors 95 and 96 may be plane or curved as desired. Although mirrors 95 and 96 have been indicated as mounted in housing 10, they may be external as well. This embodiment has the advantage of eliminating some of the sensitivity losses which occur in the previously disclosed embodiments due to partial covering or vignetting of the detector. A typical ray of radiation 97 is shown incoming and deflected by mirror 96 to sensing element 63.

Turning now to FIG. 11, a practical embodiment using the mirror arrangement disclosed in FIG. 2 along with a shielded differential element as shown in FIG. 7 is illustrated. Here, a housing 130 with dual sensing elements 62 and 63 mounted inside (not shown in FIG. 11; see FIG. 4) has a front window 131 suitably mounted to a printed circuit board 120 by leads 80. Shield 100 is attached externally across window 131. A segmented mirror 140 is utilized to produce the required plurality of fields of view. Segmented mirror 140 is shown having mirror segments 141, 142, 143, and 144 joined together.

It is obvious that a larger number of mirrors may be used if desired. Radiation coming from different directions are reflected into the sensors via window 131. Shield 100 may be a small metal strip mounted externally to block beams of energy from one or the other sensor as indicated by exemplary beams 151 and 152. The configuration of FIG. 11 is advantageous in that printed circuit board 120 may also support the electronic circuits used for processing the signals from the sensors.

As will now be recognized, an improved radiation detector has been disclosed which is free from false alarms due to ambient thermal disturbances yet will respond quickly to objects moving across its fields of view. By utilizing multiple fields of view which produce asymmetrical sensitivity of one or more dual sensors, moving objects can be easily detected whether at a distance or close up to the invention. An asymmetrical radiation focusing system is disclosed for producing a plurality of fields of view within a selected solid angle with respect to each of the sensors, the fields of view forming a pattern over a solid angle wherein the sensitivity of each of a pair of sensor elements varies in a complementary fashion over the solid angle. Therefore, a body moving through the pattern causes the radiation detector to integrate radiation energy received from each field of view for producing an output signal therefrom indicative of the body in motion. While various means of obtaining the asymmetrical sensitivity pattern have been disclosed, it will be apparent to those of skill in the art that other types of structure may be used for the same purpose and such variations and modifications are considered to fall within the spirit and scope of the invention.

I claim:

1. A radiation detector for producing a differential signal for either a near field of view or a far field of view, said detector comprising:

a radiation sensor having a pair of side by side sensing elements connected differentially for producing an essentially zero output signal if each of said elements receives equal amounts of radiated energy and in which an output signal occurs when said sensing elements receive unequal amounts of energy;

a radiation shield disposed between and perpendicular to the plane of said sensing elements; and a plurality of optical lens elements disposed in an array adjacent said sensing elements such that a plurality of discrete fields of view is produced with each lens element producing a first field of view associated with one of said pair of said sensing elements and a second field of view associated with the other of said pair of sensing elements, said shield positioned to provide a different sensitivity pattern between said first field of view and said second field of view for each of said lens elements.

2. The detector as defined in claim 1 in which said shield absorbs radiation.

3. The detector as defined in claim 1 in which said shield reflects radiation.

4. The detector as defined in claim 1 which includes means for integrating a sequence of signals from said sensing elements to produce zero output therefrom for ambient radiation and to produce nonzero output therefrom for a time sequence of pulses of radiation received by said sensing elements due to a radiation source moving through a solid angle either in the near field of view of said detector or in the far field of view of said detector.

5. An intrusion detector comprising:

an infrared sensor having a first sensing element, and a second sensing element adjacent said first sensing element, said sensing elements having electrical output leads;

a curved mirror having a plurality of segments positioned such that each of said segments focuses infrared energy on said first and second sensing elements from a different field of view than each other of said segments thereby producing a solid angle pattern having a plurality of fields of view of said detector; and pattern sensitivity control means associated with said infrared sensor for producing an asymmetrical pattern of sensitivity of said infrared detector to thereby produce a near field of detection and a far field of detection;

means for producing an essentially zero output signal from said output leads when said first and second sensing elements receive equal infrared radiation, a positive going output signal when said first sensing element receives a greater infrared radiation than said second sensing element, and a negative going signal when said second sensing element receives a greater infrared radiation than said first element for both near and far fields of detection.

6. The detector as defined in claim 5 in which said infrared sensor includes a summing amplifier connected to said output leads.

7. A device for detecting motion of a body having a temperature differing from the ambient comprising:

an integrating radiation detector having at least one pair of temperature sensor elements connected to form a differential detector;

asymmetrical radiation focusing means for producing a plurality of near and far fields of view within a selected solid angle with respect to each of said sensor elements, said fields of view forming a pattern over said solid angle wherein the sensitivity of each one of said pair of said sensor elements varies in a complementary fashion over said solid angle, means for integrating radiation energy from each field of view caused by said body moving through said pattern, said means producing an output signal indicative of body motion for said body moving either in said near field of view of for said body moving in said far field of view.

* * * * *